(12) United States Patent
Horiuchi

(10) Patent No.: US 8,961,636 B2
(45) Date of Patent: Feb. 24, 2015

(54) OIL SEPARATOR

(71) Applicant: Toyota Boshoku Kabushiki Kaisha, Aichi-ken (JP)

(72) Inventor: Yoji Horiuchi, Kariya (JP)

(73) Assignee: Toyota Boshoku Kabushiki Kaisha, Aichi-Ken (JP)

( * ) Notice: Subject to any disclaimer, the term of this patent is extended or adjusted under 35 U.S.C. 154(b) by 0 days.

(21) Appl. No.: 13/856,739

(22) Filed: Apr. 4, 2013

(65) Prior Publication Data

US 2014/0165512 A1  Jun. 19, 2014

(30) Foreign Application Priority Data

May 24, 2012 (JP) .................. 2012-118992

(51) Int. Cl.
*B01D 46/00* (2006.01)
*B01D 45/08* (2006.01)
*F01M 13/04* (2006.01)

(52) U.S. Cl.
CPC ............... *B01D 45/08* (2013.01); *F01M 13/04* (2013.01); *Y10S 55/19* (2013.01)
USPC ................ 55/320; 55/385.3; 55/462; 55/490; 55/DIG. 19; 123/41.86

(58) Field of Classification Search
USPC .................. 55/464, 322, 446, 385.3, DIG. 28; 123/198 E, 572, 573, 41.86, 184.21; 96/187
See application file for complete search history.

(56) References Cited

U.S. PATENT DOCUMENTS

| 4,607,604 | A | * | 8/1986 | Kanoh et al. | 123/572 |
| 4,627,406 | A | * | 12/1986 | Namiki et al. | 123/573 |
| 6,143,049 | A | * | 11/2000 | Gieseke et al. | 55/385.3 |
| 8,267,071 | B2 | * | 9/2012 | Janssen et al. | 123/572 |
| 2005/0092267 | A1 | * | 5/2005 | Nonaka et al. | 123/41.86 |
| 2008/0135030 | A1 | * | 6/2008 | Knaus et al. | 123/572 |
| 2010/0107883 | A1 | * | 5/2010 | Faber et al. | 96/187 |
| 2010/0126479 | A1 | * | 5/2010 | Shieh et al. | 123/573 |
| 2012/0012074 | A1 | * | 1/2012 | Adrian et al. | 123/41.86 |
| 2012/0312270 | A1 | * | 12/2012 | Kaiser et al. | 123/184.21 |
| 2013/0276767 | A1 | * | 10/2013 | Polichetti et al. | 123/573 |
| 2014/0157737 | A1 | * | 6/2014 | Schleiden et al. | 55/464 |

FOREIGN PATENT DOCUMENTS

| JP | 2004-211670 | 7/2004 |
| JP | 2009-068471 | 4/2009 |

* cited by examiner

*Primary Examiner* — Duane Smith
*Assistant Examiner* — Minh-Chau Pham
(74) *Attorney, Agent, or Firm* — Greenblum & Bernstein, P.L.C.

(57) ABSTRACT

The present oil separator is an oil separator for capturing oil contained in blow-by gas generated in an engine, and includes a housing provided independently of a body of the engine and a gas-liquid separation unit which is provided in the housing and separates blow-by gas into a gas component and an oil component. The housing includes a lead-in port through which the blow-by gas is led in, a lead-out port through which the gas component is led out, and a drain port through which the oil component is discharged. And the housing has an attachment portion inside to which a plurality of types of the gas-liquid separation units respectively are attachable, to which attachment portion, selected one of the plurality of types of gas-liquid separation units is attached.

4 Claims, 12 Drawing Sheets

(a)

(b)

(a)

(b)

OIL SEPARATOR

CROSS-REFERENCE TO RELATED APPLICATIONS

The present application claims priority under 35 U.S.C. §119 of Japanese Application No. 2012-118992 filed on May 24, 2012, the disclosure of which is expressly incorporated by reference herein in its entirety.

BACKGROUND OF THE INVENTION

1. Field of the Invention

The invention relates to an oil separator and, more specifically, to an oil separator that has a simple low-cost structure and can be applied to various types of engines.

2. Description of Related Art

Conventionally, a so-called positive crankcase ventilation (PCV) system has been known, which separates oil mist from blow-by gas generated in an engine and returns an oil component to an oil pan and a gas component to an induction system for re-combustion. As an oil separator used in the PCV system, those that utilize inertial collision or filtration by use of a filter have been known (see, for example, JP 2009-68471A and JP 2004-211670A).

The oil separator to be used depends on engine types and performance requirements, for example. Consequently, even if the oil separator is provided independently of a body of an engine, it is used only as an exclusive component of the engine of respective types and may contribute to an increase in number of types of the components, giving rise to a problem in high production cost.

SUMMARY OF THE INVENTION

In view of the above, the invention has been made, and it is an object of the invention to provide an oil separator that has a simple low-cost structure and can be applied to various types of engines.

One aspect of the present embodiments provides an oil separator for capturing oil contained in blow-by gas generated in an engine, comprising: a housing provided independently of a body of the engine; and a gas-liquid separation unit which is provided in the housing and separates blow-by gas into a gas component and an oil component, wherein: the housing includes a lead-in port which is provided on the upstream side of the gas-liquid separation unit and through which the blow-by gas is led in, a lead-out port which is provided on the downstream side of the gas-liquid separation unit and through which the gas component is led out, and a drain port which is provided on the downstream side of the gas-liquid separation unit and through which the oil component is discharged; and the housing has an attachment portion inside to which a plurality of types of gas-liquid separation units respectively are attachable, to which a selected one of a plurality of types of gas-liquid separation units is attached.

In a further aspect, the housing includes a first case and a second case whose connecting circumferential surfaces are connected with each other; the attachment portion includes a first attachment portion provided along and in the vicinity of the connecting circumferential surface of the first case and a second attachment portion provided along and in the vicinity of the connecting circumferential surface of the second case; and the gas-liquid separation unit is sandwiched by the first attachment portion and the second attachment portion.

In a further aspect, the housing includes a first case and a second case whose connecting circumferential surfaces are connected with each other; and the attachment portion is provided on one of the first and second cases.

In a further aspect, the housing includes a first case and a second case whose connecting circumferential surfaces are connected with each other; the attachment portion includes a first attachment portion which has a concave-shaped vertical section and is provided on the first case and a second attachment portion which has a concave-shaped vertical section and is provided on the second case; and the gas-liquid separation unit is sandwiched by the first attachment portion and the second attachment portion.

In a further aspect, a plurality of types of the gas-liquid separation units includes a filter type gas-liquid separation unit having a filter through which all of blow-by gas passes, an impact type gas-liquid separation unit having a collision wall with which blow-by gas collides, and an impact filter type gas-liquid separation unit having a collision wall with which blow-by gas collides and a filter through which some of the blow-by gas passes.

According to the oil separator of the present embodiments, includes: a housing provided independently of a body of an engine; and a gas-liquid separation unit which is provided in the housing and separates blow-by gas into a gas component and an oil component. The housing includes: a lead-in port which is provided on the upstream side of the gas-liquid separation unit and through which the blow-by gas is led in; a lead-out port which is provided on the downstream side of the gas-liquid separation unit and through which the gas component is led out; and a drain port which is provided on the downstream side of the gas-liquid separation unit and through which the oil component is discharged. Thus, the blow-by gas led into the housing from the lead-in port is separated by the gas-liquid separation unit into the gas component and the oil component, which gas component is led out of the housing through the lead-out port and which oil component is discharged out of the housing through the drain port. Further, the housing has an attachment portion inside to which a plurality of types of gas-liquid separation units can be attached, to which a selected one of a plurality of types of gas-liquid separation units is attached. Thus, an appropriate gas-liquid separation unit can be selected in accordance with an engine type and performance requirements and attached to the attachment portion. Consequently, the invention can be applied to various types of engines. Further, by using a common housing and a common forming die for a plurality of types of gas-liquid separation units, it is possible to reduce cost and simplify processes, thereby providing a simple low-cost structure.

Further, when the housing includes a first case and a second case whose connecting circumferential surfaces are connected, the attachment portion includes a first attachment portion provided along and in the vicinity of the connecting circumferential surface of the first case and a second attachment portion provided along and in the vicinity of the connecting circumferential surface of the second case, and the gas-liquid separation unit is sandwiched by the first attachment portion and the second attachment portion, connecting position of the first and second cases and an attaching position of the gas-liquid separation unit are adjacent to each other, so that the first and second cases and the gas-liquid separation unit can be connected using a common connecting portion. Consequently, ease of assembly for the oil separator further is improved.

Further, when the housing includes a first case and a second case whose connecting circumferential surfaces are connected with each other and the attachment portion is provided on one of the first and second cases, it is possible to attach the gas-liquid separation unit to the attachment portion on one of the first and second cases and then connect the first and second case to face each other. Consequently, ease of assembly for the oil separator is improved.

Further, when the housing includes a first case and a second case whose connecting circumferential surfaces are connected with each other, the attachment portion includes a first attachment portion which has a concave-shaped vertical section and is provided on the first case and a second attachment portion which has a concave-shaped vertical section and is provided on the second case, and the gas-liquid separation unit is sandwiched by the first attachment portion and the second attachment portion, it is possible to attach the gas-liquid separation unit to one of the attachment portions and then connect the first and second cases to face each other. Consequently, ease of assembly for the oil separator is improved.

Moreover, when a plurality of types of the gas-liquid separation units includes a filter type gas-liquid separation unit, an impact type gas-liquid separation unit, and an impact filter type gas-liquid separation unit, it is possible, for example, to select the filter type gas-liquid separation unit for high oil capture efficiency, the impact type gas-liquid separation unit for low pressure loss, or the impact filter type gas-liquid separation unit for an approximately medium oil capture efficiency and pressure loss.

BRIEF DESCRIPTION OF DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF PREFERRED EMBODIMENTS

Figure 1:
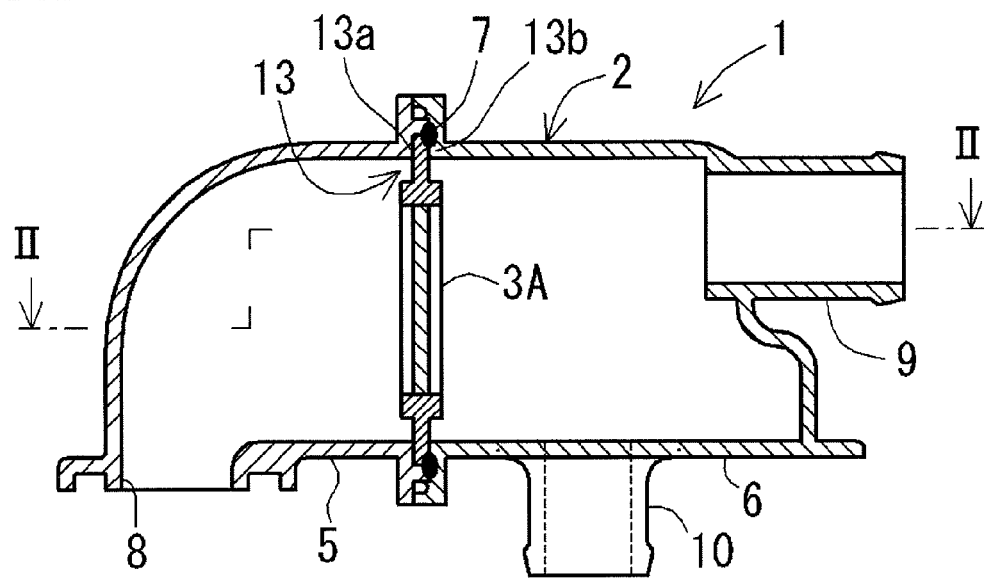
FIG. 1 is a vertical cross-sectional view of an oil mist separator according to the first embodiment.

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description is taken with the drawings making apparent to those skilled in the art how the forms of the present invention may be embodied in practice.

An oil separator (1, 21, 41) according to the first embodiment captures oil contained in blow-by gas generated in an engine and includes a housing (2, 22, 42) provided independently of a body of the engine and a gas-liquid separation unit (3A to 3C, 23A to 23C) which is provided in the housing and separates the blow-by gas into a gas component and an oil component. The housing includes a lead-in port (8, 28, 48) which is provided on the upstream side of the gas-liquid separation unit and through which the blow-by gas is led in, a lead-out port (9, 29, 49) which is provided on the downstream side of the gas-liquid separation unit and through which the gas component is led out, and a drain port (10, 30, 50) which is provided on the downstream side of the gas-liquid separation unit and through which the oil component is discharged, and the housing has an attachment portion (13, 33, 53) inside, to which a plurality of types of the gas-liquid separation units can be attached. To the attachment portion, a selected one of the plurality of types of gas-liquid separation units is attached (see for example, FIGS. 1, 8, 15, etc.).

The oil separator according to the first embodiment may include, for example, an aspect in which the housing (2) includes a first case (5) and a second case (6) whose connecting circumferential surfaces (5a, 6a) are connected with each other; the attachment portion (13) includes a first attachment portion (13a) provided along and in the vicinity of the connecting circumferential surface of the first case and a second attachment portion (13b) provided along and in the vicinity of the connecting circumferential surface of the second case; and the gas-liquid separation unit (3A to 3C) is sandwiched by the first attachment portion and the second attachment portion (see, for example, FIG. 1 etc.).

Figure 8:
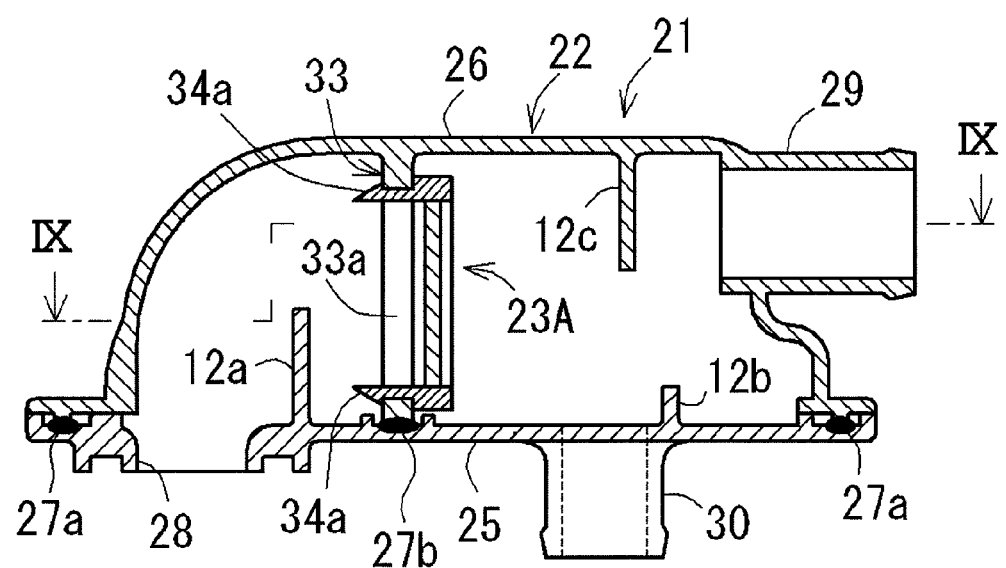
FIG. 8 is a vertical cross-sectional view of an oil mist separator according to the second embodiment.

The oil separator according to the first embodiment may include, for example, an aspect in which the housing (22) includes a first case (25) and a second case (26) whose connecting circumferential surfaces (25a, 26a) are connected with each other and the attachment portion (33) is provided on one of the first and second cases (see, for example, FIG. 8 etc.).

Figure 15:
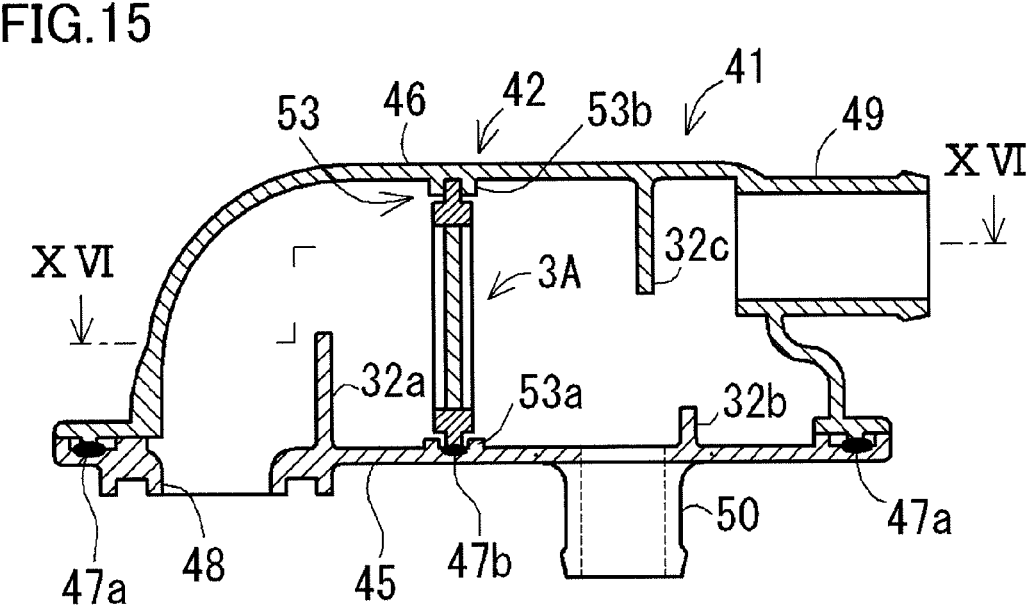
FIG. 15 is a vertical cross-sectional view of an oil mist separator according to the third embodiment.

The oil separator according to the first embodiment may include, for example, an aspect in which the housing (42) includes a first case (45) and a second case (46) whose connecting circumferential surfaces (45a, 46a) are connected with each other; the attachment portion (53) includes a first attachment portion (53a) which has a concave-shaped vertical section and is provided on the first case and a second attachment portion (53b) which has a concave-shaped vertical section and is provided on the second case; and the gas-liquid separation unit (3A to 3C) is sandwiched by the first attachment portion and the second attachment portion (see, for example, FIG. 15 etc.).

The oil separator according to the first embodiment may include, for example, an aspect in which a plurality of types of the gas-liquid separation units includes a filter type gas-liquid separation unit (3A, 23A) having a filter (15, 35) through which all of the blow-by gas passes; an impact type gas-liquid separation unit (3B, 23B) having a collision wall (18, 38) with which the blow-by gas collides; and an impact filter type gas-liquid separation unit (3C, 23C) having the collision wall (18, 38) with which the blow-by gas collides and a filter (19, 39) through which some of the blow-by gas passes (see, for example, FIGS. 3 to 5, 10 to 12, etc.).

A method for assembling the oil separator according to the second embodiment provides a method for assembling the oil separator according to the first embodiment, the method including processes of: preparing the plurality of types of gas-liquid separation units; and selecting and attaching one of a plurality of types of gas-liquid separation units to the attachment portion.

EXAMPLE

The following will specifically describe the invention for the first through third embodiments with reference to the drawings.

First Embodiment (1) Configuration of Oil Separator

Figure 2:
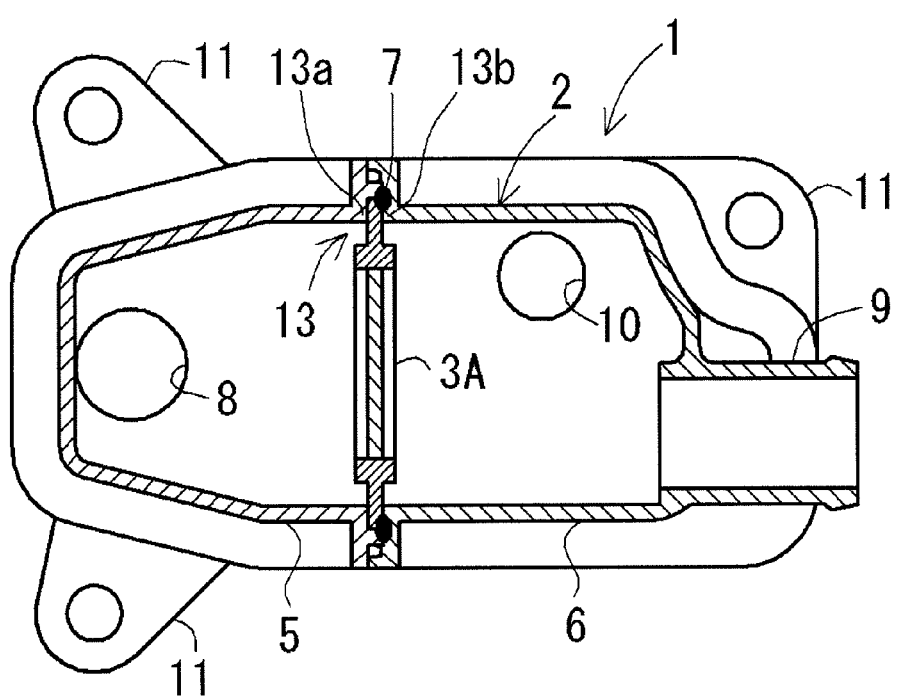
FIG. 2 is a cross-sectional view taken along line II-II of FIG. 1.

An oil separator 1 according to the present embodiment is an oil mist separator for capturing oil mist contained in blow-by gas generated in an engine (not shown), as shown in FIGS. 1 and 2. The oil separator 1 includes a housing 2 provided independently of a body of the engine and a gas-liquid separation unit 3A (3B, 3C) which is provided in the housing 2 and separates the blow-by gas into a gas component and an oil component.

The housing 2 includes first and second cases 5 and 6 made of resin, whose connecting circumferential surfaces 5a and 6a (see FIG. 6) are connected with each other at a welded portion 7 using vibration welding. The first case 5 has a hole-shaped lead-in port 8 which is provided on the upstream side of the gas-liquid separation unit 3A (3B, 3C) and through which blow-by gas is led in. Further, the second case 6 has a tube-shaped lead-out port 9 which is provided on the downstream side of the gas-liquid separation unit 3A (3B, 3C) and through which a gas component is led out and a tube-shaped drain port 10 which is provided on the downstream side of the gas-liquid separation unit 3A (3B, 3C) and through which an oil component is discharged. Moreover, on each of bottom surfaces of the first case 5 and the second case 6, a fixation portion 11 (see FIG. 2) is provided which is fixed to the outer surface of a cylinder head cover (not shown) with a screw etc.

In the housing 2, an attachment portion 13 is provided, to which the gas-liquid separation unit 3A (3B, 3C) is attached. The attachment portion 13 includes a first attachment portion 13a provided circumferentially along and in the vicinity of the connecting circumferential surface 5a of the first case 5 and a second attachment portion 13b provided circumferentially along and in the vicinity of the connecting circumferential surface 6a of the second case 6 (se FIG. 6). The first attachment portion 13a is in contact with one side of the outer circumferential surface of the gas-liquid separation unit 3A (3B, 3C). The second attachment portion 13b is in contact with the other side of the outer circumferential surface of the gas-liquid separation unit 3A (3B, 3C).

Figure 4:
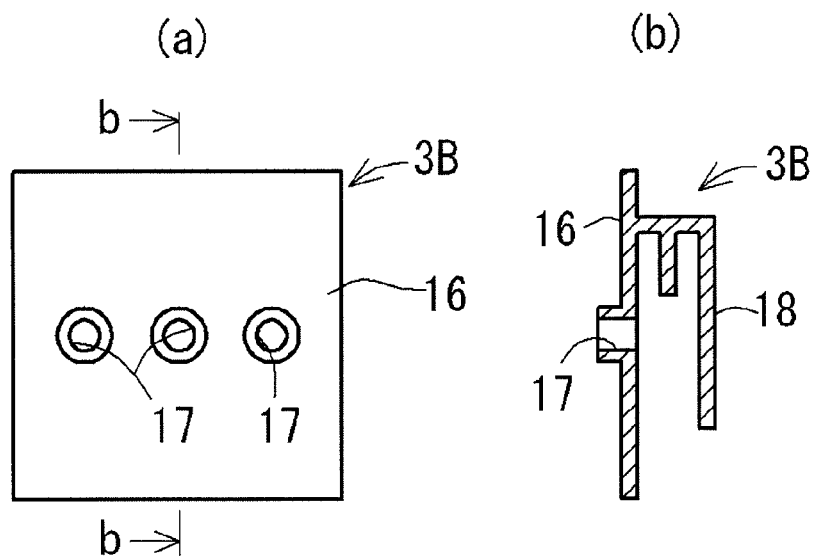
FIGS. 4(a) and (b) are explanatory views of an impact type gas-liquid separation unit according to the first embodiment, FIG. 4(a) being a front view of the gas-liquid separation unit, and FIG. 4(b) being a cross-sectional view taken along line b-b of FIG. 4(a)
Figure 5:
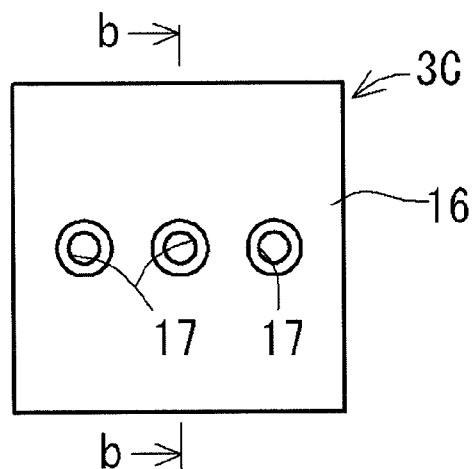
FIGS. 5(a) and (b) are explanatory views of an impact filter type gas-liquid separation unit according to the first embodiment, FIG. 5(a) being a front view of the gas-liquid separation unit, and FIG. 5(b) being a cross-sectional view taken along line b-b of FIG. 5(a)
Figure 5:
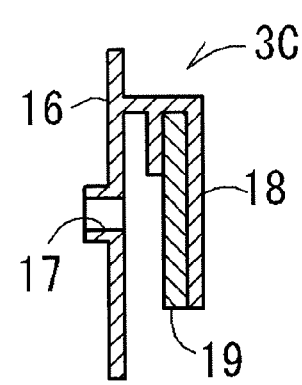

As the gas-liquid separation unit according to the first embodiment, three types of units are prepared: the filter type gas-liquid separation unit 3A (see FIG. 3), the impact type gas-liquid separation unit 3B (see FIG. 4), and the impact filter type gas-liquid separation unit 3C (see FIG. 5). Among those gas-liquid separation units 3A to 3C, the filter type gas-liquid separation unit 3A has the highest oil capture efficiency and pressure loss, and the impact type gas-liquid separation unit 3B has the lowest oil capture efficiency and pressure loss. The impact filter type gas-liquid separation unit 3C has an approximately medium oil capture efficiency and pressure loss between the gas-liquid separation units 3A and 3B.

Figure 3:
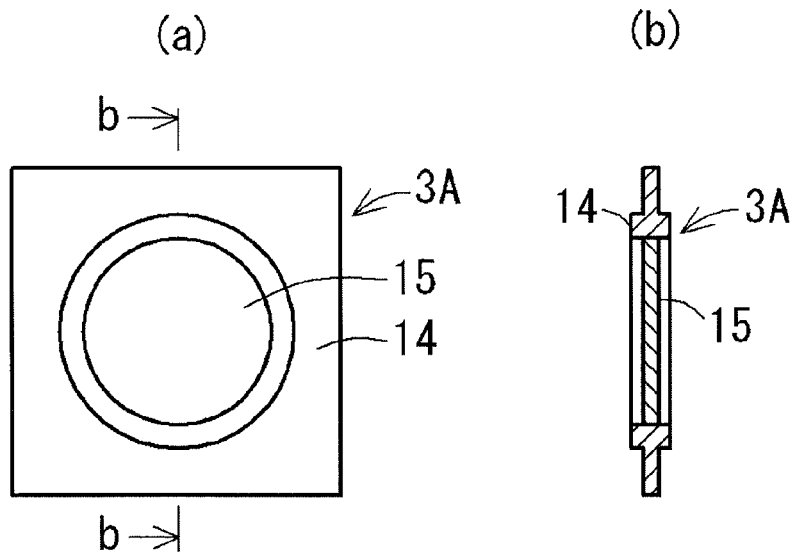
FIGS. 3(a) and (b) are explanatory views of a filter type gas-liquid separation unit according to the first embodiment, FIG. 3(a) being a front view of the gas-liquid separation unit, and FIG. 3(b) being a cross-sectional view taken along line b-b of FIG. 3(a)

The filter type gas-liquid separation unit 3A includes a frame-shaped support body 14 made of resin and a filter 15 which is made of filter paper and supported in the support body 14 and through which all (all volume) of blow-by gas led into the housing 2 passes, as shown in FIG. 3. The impact type gas-liquid separation unit 3B includes a plate-shaped support body 16 made of resin, a plurality of (3 in the figure) throttle flow paths 17 formed in the support body 16, and a collision wall 18 which is supported on the support body 16 to face openings of those throttle flow paths 17, as shown in FIG. 4. Further, as shown in FIG. 5, in addition to the support body 16, the throttle flow paths 17, and the collision wall 18 each having the same configuration as those of the gas-liquid separation unit 3B respectively, the impact filter type gas-liquid separation unit 3C includes a filter 19 which is made of filter paper and attached to the surface of the collision wall 18 and through which some of the blow-by gas led into the housing 2 passes.

The support bodies 14 and 16 have the same outer appearances and any one of the gas-liquid separation units 3A to 3C can be attached to the attachment portion 13. In fact, one gas-liquid separation unit 3A selected from the plurality of types of gas-liquid separation units 3A to 3C is attached to the attachment portion 13.

(2) Method for Assembling Oil Separator

Figure 6:
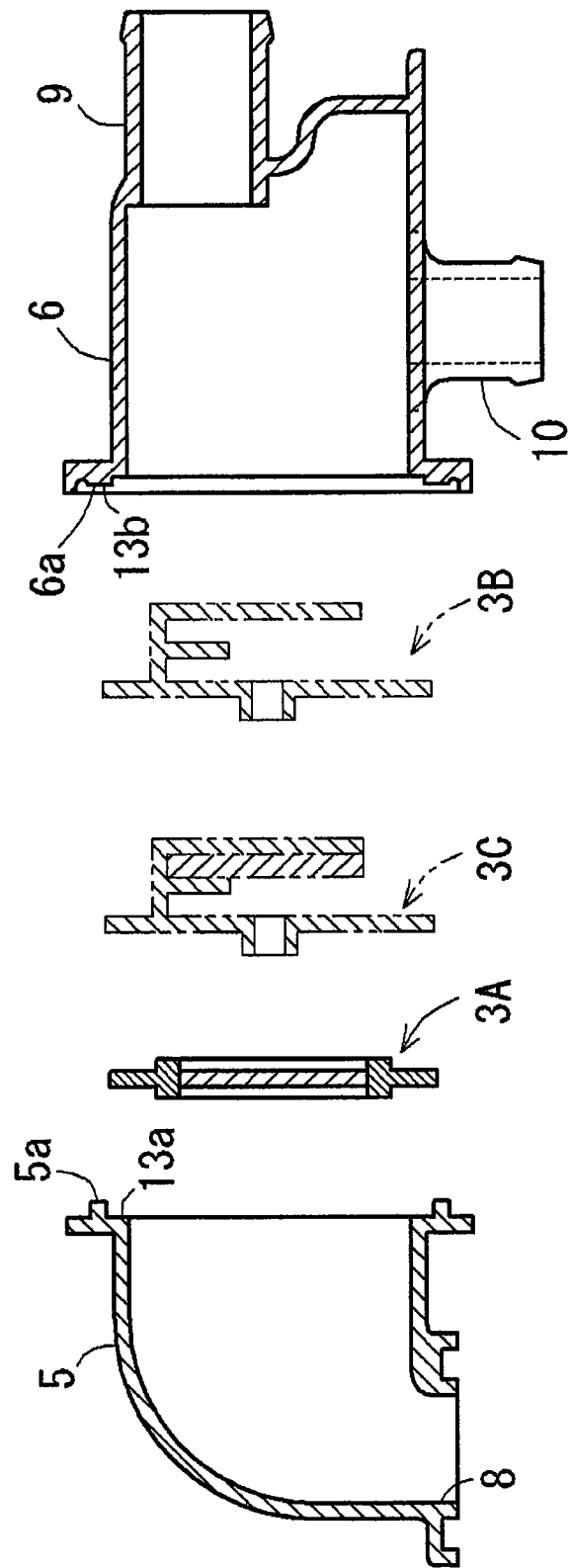
FIG. 6 is an explanatory view of a method for assembling the oil mist separator.
Figure 7:
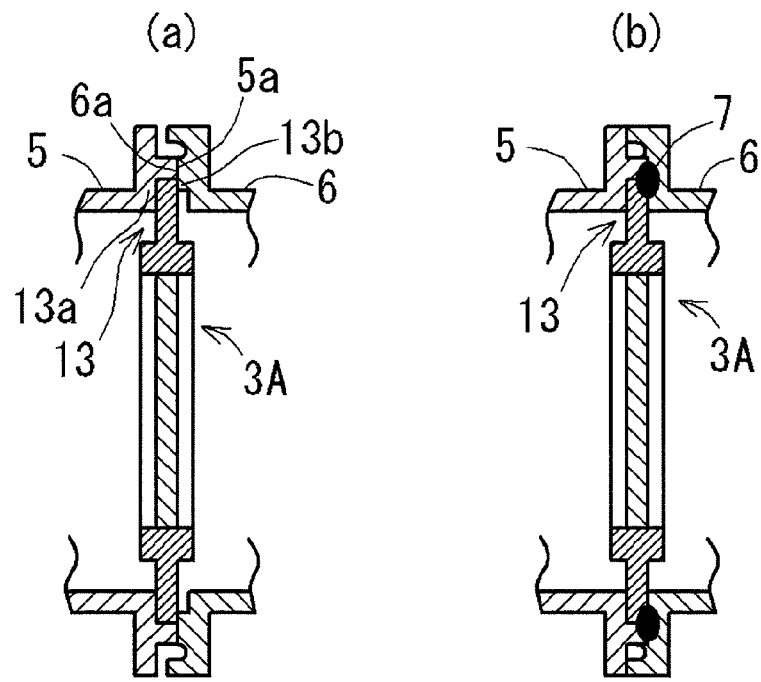
FIGS. 7(a) and (b) are explanatory views of the method for assembling the oil mist separator, FIG. 7(a) showing a state where connecting circumferential surfaces of the respective first and second cases are in contact with each other, and FIG. 7(b) showing a state where the connecting circumferential surfaces of the first and second cases are connected with each other.

Next, a description will be given of a method for assembling the oil separator 1 having the configuration described above. As shown in FIG. 6, from among the plurality of types of gas-liquid separation units 3A to 3C, the appropriate gas-liquid separation unit 3A is selected in accordance with an engine type and performance requirements. Next, by making the connecting circumferential surfaces 5a and 6a of the first case 5 and the second case 6 face each other, the gas-liquid separation unit 3A is sandwiched by the first attachment portion 13a and the second attachment portion 13b (see FIG. 7(a)). Subsequently, the connecting circumferential surfaces 5a and 6a of the first case 5 and the second case 6 are connected with each other by vibration welding. Then, welding heat from those connecting circumferential surfaces 5a and 6a is transmitted to the outer circumference of the support body 14 of the gas-liquid separation unit 3A to melt the transmitted portion. Consequently, at the welded portion 7 using vibration welding, the first case 5, the second case 6, and the gas-liquid separation unit 3A are connected integrally (see FIG. 7(b)).

(3) Effects of the Embodiment

As described above, the oil separator 1 of the present embodiment includes the housing 2 provided independently of the body of the engine and the gas-liquid separation unit 3A (3B, 3C) which is provided in the housing 2 and separates blow-by gas into a gas component and an oil component. The housing 2 includes: the lead-in port 8 which is provided on the upstream side of the gas-liquid separation unit 3A (3B, 3C) and through which the blow-by gas is led in; the lead-out port 9 which is provided on the downstream side of the gas-liquid separation unit 3A (3B, 3C) and through which the gas component is led out; and the drain port 10 which is provided on the downstream side of the gas-liquid separation unit 3A (3B, 3C) and through which the oil component is discharged. Thus, the blow-by gas led into the housing 2 from the lead-in port 8 is separated by the gas-liquid separation unit 3A (3B, 3C) into the gas component and the oil component, which gas component is led out of the housing 2 through the lead-out port 9 and which oil component is discharged out of the housing 2 through the drain port 10.

Further, in the present embodiment, the housing 2 has the attachment portion 13 inside, to which a plurality of types of the gas-liquid separation units 3A to 3C can be attached. To the attachment portion 13, one gas-liquid separation unit 3A (3B, 3C) selected from among the plurality of types of gas-liquid separation units 3A to 3C is attached. Therefore, the appropriate gas-liquid separation unit 3A (3B, 3C) can be selected in accordance with an engine type and performance requirements and attached to the attachment portion 13. Consequently, the present embodiment can be applied to various types of engines. Further, by using the same housing 2 and a common forming die for a plurality of types of gas-liquid separation units, it is possible to reduce cost and simplify processes, thereby providing a simple low-cost structure.

Further, in the present embodiment, the housing 2 includes the first case 5 and the second case 6 whose connecting circumferential surfaces 5a and 6a are connected with each other, the attachment portion 13 includes the first attachment portion 13a provided along and in the vicinity of the connecting circumferential surface 5a of the first case 5 and the second attachment portion 13b provided along and in the vicinity of the connecting circumferential surface 6a of the second case 6, and the gas-liquid separation unit 3A (3B, 3C) is sandwiched by the first attachment portion 13a and the second attachment portion 13b. Thus, connecting position of the first case 5 and second case 6 and an attachment position of the gas-liquid separation unit 3A (3B, 3C) are adjacent to each other to enable connection of the first and second cases 5 and 6 and the gas-liquid separation unit 3A (3B, 3C) using a common connecting portion. Consequently, ease of assembly for the oil separator 1 further is improved.

Further, in the present embodiment, the attachment portion 13 is formed as a closed ring, so that the entire outer circumference of the gas-liquid separation unit 3A (3B, 3C) is attached to the inner circumferential surface of the housing 2 with no gap in between, thereby improving gas-liquid separation efficiency for the blow-by gas.

Further, in the present embodiment, the first case 5, the second case 6, and the gas-liquid separation unit 3A (3B, 3C) are connected integrally at the welded portion 7 using vibration welding, so that the gas-liquid separation unit 3A (3B, 3C) can be attached securely to further improve ease of assembly for the oil separator 1.

Moreover, in the present embodiment, the plurality of types of gas-liquid separation units includes the filter type gas-liquid separation unit 3A, the impact type gas-liquid separation unit 3B, and the impact filter type gas-liquid separation unit 3C. Therefore, it is possible, for example, to select the filter type gas-liquid separation unit 3A for high oil capture efficiency, the impact type gas-liquid separation unit 3B for low pressure loss, or the impact filter type gas-liquid separation unit 3C for an approximately medium oil capture efficiency and pressure loss.

Second Embodiment (1) Configuration of Oil Separator

Figure 9:
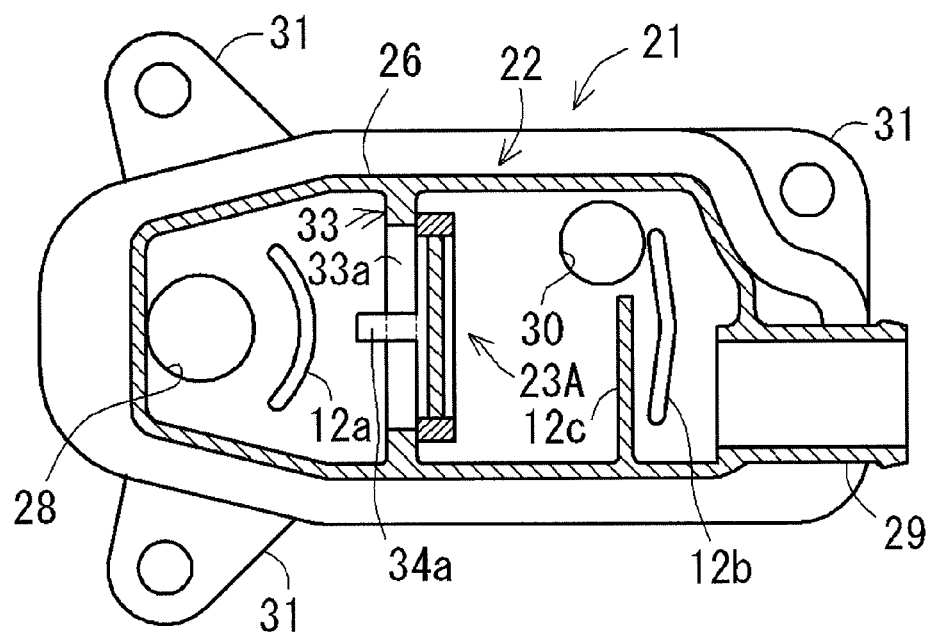
FIG. 9 is a cross-sectional view taken along line IX-IX of FIG. 8.

An oil separator 21 according to the present embodiment is an oil mist separator for capturing oil mist contained in blow-by gas generated in an engine (not shown), as shown in FIGS. 8 and 9. The oil separator 21 includes a housing 22 provided independently of a body of the engine and a gas-liquid separation unit 23A (23B, 23C) which is provided in the housing 22 and separates the blow-by gas into a gas component and an oil component.

The housing 22 includes first and second cases 25 and case 26 made of resin, whose connecting circumferential surfaces 25a and 26a (see FIG. 13) are connected with each other at a welded portion 27a using vibration welding. The first case 25 has a hole-shaped lead-in port 28 which is provided on the upstream side of the gas-liquid separation unit 23A (23B, 23C) and through which blow-by gas is led in and a tube-shaped drain port 30 which is provided on the downstream side of the gas-liquid separation unit 23A (23B, 23C) and through which the oil component is discharged. Further, the second case 26 has a tube-shaped lead-out port 29 which is provided on the downstream side of the gas-liquid separation unit 23A (23B, 23C) and through which the gas component is led out. Moreover, on the bottom surface of the first case 25, a fixation portion 31 (see FIG. 9) is provided which is fixed to the outer surface of a cylinder head cover (not shown) with a screw etc.

The first case 25 is provided with a baffle plate 12a which blocks the blow-by gas led in through the lead-in port 28 flowing directly toward the gas-liquid separation unit 23A (23B, 23C) and a guide plate 12b which guides the separated oil component to the drain port 30. Further, the second case 26 is provided with a baffle plate 12c, which blocks the separated gas component flowing directly to the lead-out port 29.

In the housing 22, an attachment portion 33 is provided, which has an attachment hole 33a, in which the gas-liquid separation unit 23A (23B, 23C) is attached. The attachment portion 33 is integrally provided in a wall shape to the inner circumferential surface of the second case 26 to divide an internal space of the housing 22 into the upstream side and the downstream side together with the attached gas-liquid separation unit 23A (23B, 23C) (see FIG. 13).

Figure 11:
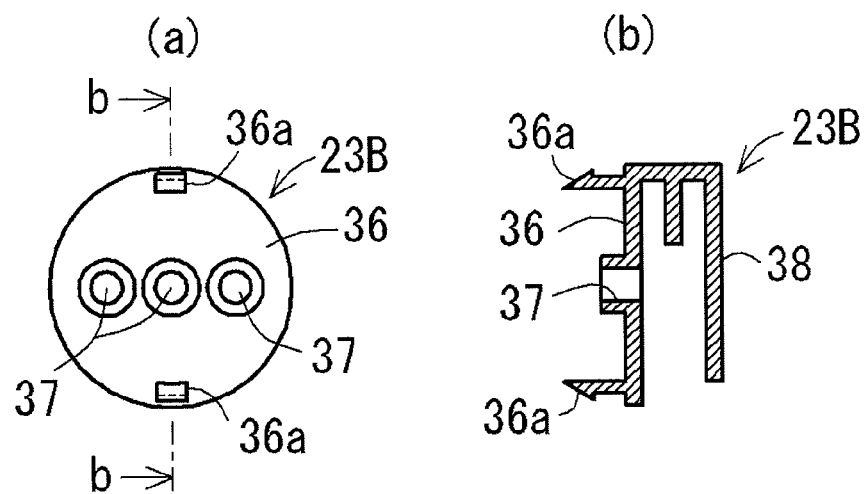
FIGS. 11(a) and (b) are explanatory views of an impact type gas-liquid separation unit according to the second embodiment, FIG. 11(a) being a front view of the gas-liquid separation unit, and FIG. 11(b) being a cross-sectional view taken along line b-b of FIG. 11(a)
Figure 12:
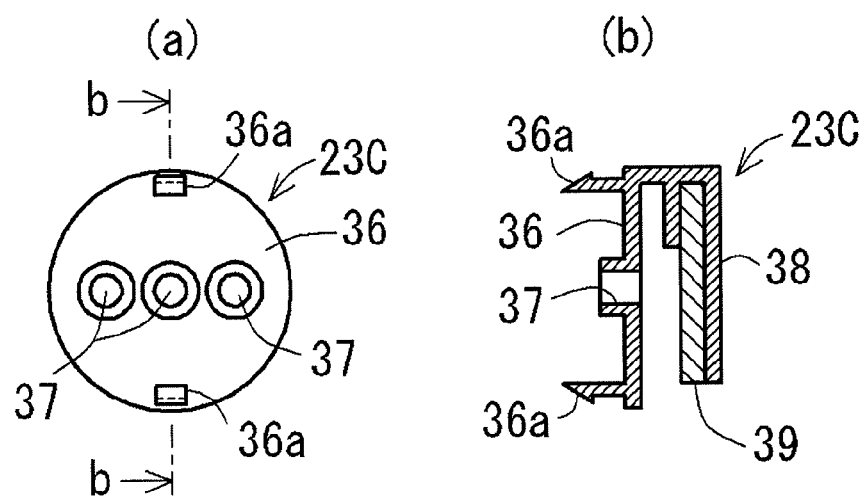
FIGS. 12(a) and (b) are explanatory views of an impact filter type gas-liquid separation unit according to the second embodiment, FIG. 12(a) being a front view of the gas-liquid separation unit, and FIG. 12(b) being a cross-sectional view taken along line b-b of FIG. 12(a)

As the gas-liquid separation unit according to the second embodiment, three types of units are prepared: the filter type gas-liquid separation unit 23A (see FIG. 10), the impact type gas-liquid separation unit 23B (see FIG. 11), and the impact filter type gas-liquid separation unit 23C (see FIG. 12). Among those gas-liquid separation units 23A to 23C, the filter type gas-liquid separation unit 23A has the highest oil capture efficiency, and pressure loss and the impact type gas-liquid separation unit 23B has the lowest oil capture efficiency and pressure loss. The impact filter type gas-liquid separation unit 23C has an approximately medium oil capture efficiency and pressure loss between the gas-liquid separation units 23A and 23B.

Figure 10:
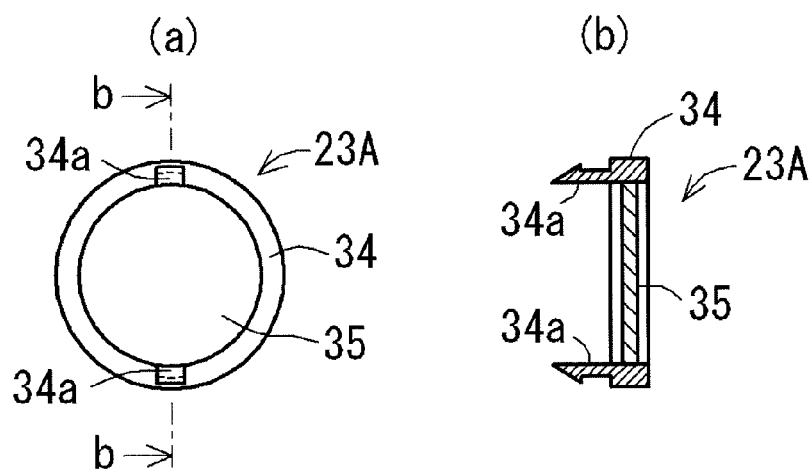
FIGS. 10(a) and (b) are explanatory views of a filter type gas-liquid separation unit according to the second embodiment, FIG. 10(a) being a front view of the gas-liquid separation unit, and FIG. 10(b) being a cross-sectional view taken along line b-b of FIG. 10(a)

The filter type gas-liquid separation unit 23A includes a frame-shaped support body 34 made of resin and a filter 35 which is made of filter paper and supported in the support body 34 and through which all (all volume) of blow-by gas led into the housing 22 passes, as shown in FIG. 10. On the support body 34, a hook portion 34a is erected, which is locked into the attachment hole 33a of the attachment portion 33 as it is inserted therein. Further, the impact type gas-liquid separation unit 23B includes a disc-shaped support body 36 made of resin, a plurality of (3 in the figure) throttle flow paths 37 formed in the support body 36, and a collision wall 38 which is supported on the support body 36 to face openings of those throttle flow paths 37, as shown in FIG. 11. On the support body 36, a hook portion 36a is erected, which is locked into the attachment hole 33a of the attachment portion 33 as it is inserted therein. Further, as shown in FIG. 12, in addition to the support body 36, the throttle flow paths 37, and the collision wall 38 each having the same configuration as those of the gas-liquid separation unit 23B respectively, the impact filter type gas-liquid separation unit 23C includes a filter 39 which is made of filter paper and attached to the surface of the collision wall 38 and through which some of the blow-by gas led into the housing 22 passes.

The hook portions 34a and 36a have the same outer appearances and layout, and any one of the gas-liquid separation units 23A to 23C can be attached to the attachment portion 33. In fact, one gas-liquid separation unit 23A (23B, 23C) selected from the plurality of types of gas-liquid separation units 23A to 23C is attached to the attachment portion 33.

(2) Method for Assembling Oil Separator

Figure 13:
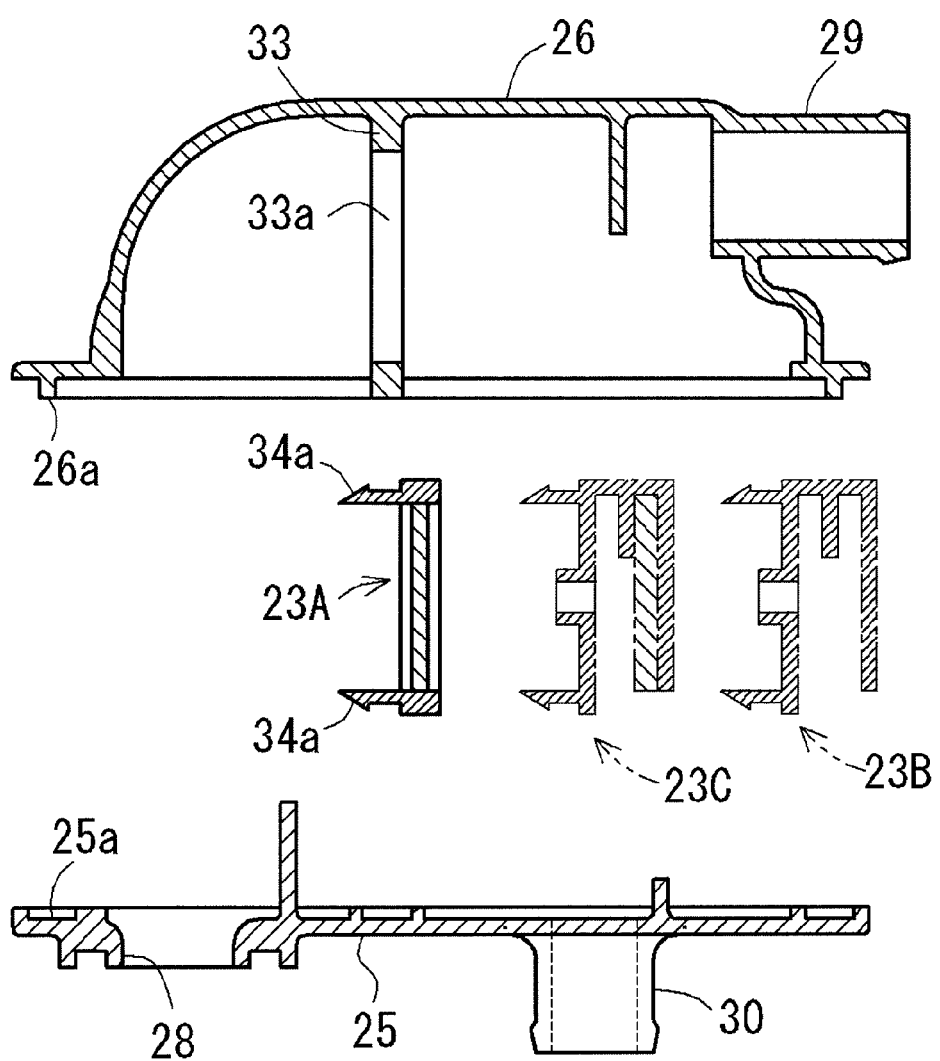
FIG. 13 is an explanatory view of a method for assembling the oil mist separator.
Figure 14:
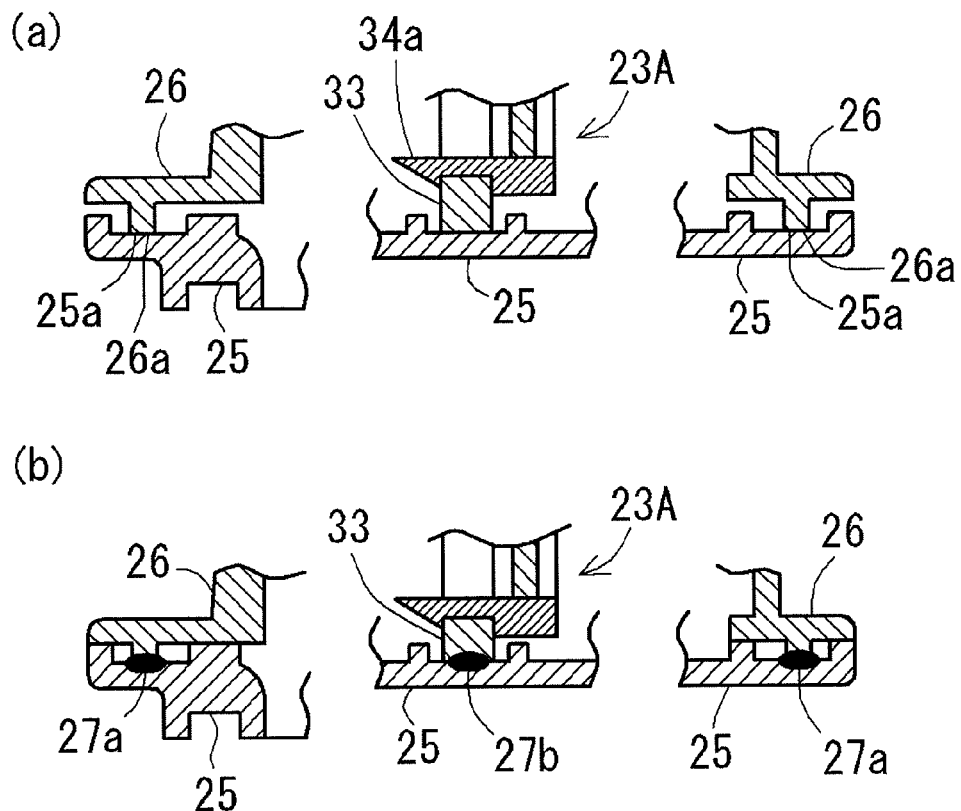
FIGS. 14(a) and (b) are explanatory views of the method for assembling the oil mist separator, FIG. 14(a) showing a state where connecting circumferential surfaces of the respective first and second cases are in contact with each other, and FIG. 14(b) showing a state where the connecting circumferential surfaces of the first and second cases are connected.

Next, a description will be given of a method for assembling the oil separator 21 having the configuration described above. As shown in FIG. 13, among the plurality of types of gas-liquid separation units 23A to 23C, the appropriate gas-liquid separation unit 23A is selected in accordance with an engine type and performance requirements. Next, the hook portion 34a is inserted and locked to the attachment hole 33a of the attachment portion 33, and thereby, the gas-liquid separation unit 23A is attached. Then the connecting circumferential surfaces 25a and 26a of the first case 25 and the second case 26 are made contact with each other (see FIG. 14(a)). Subsequently, by vibration welding, the connecting circumferential surfaces 25a and 26a of the first and second cases 25 and 26 are connected with each other at the welded portion 27a, while the lower end surface of the attachment portion 33 and the first case 25 are connected with each other at the welded portion 27b (see FIG. 14(b)).

(3) Effects of the Embodiment

As described above, the oil separator 21 of the present embodiment includes the housing 22 provided independently of the body of the engine and the gas-liquid separation unit 23A (23B, 23C) which is provided in the housing 22 and separates blow-by gas into a gas component and an oil component. The housing 22 includes: the lead-in port 28 which is provided on the upstream side of the gas-liquid separation unit 23A (23B, 23C) and through which the blow-by gas is led in; the lead-out port 29 which is provided on the downstream side of the gas-liquid separation unit 23A (23B, 23C) and through which the gas component is led out; and the drain port 30 which is provided on the downstream side of the gas-liquid separation unit 23A (23B, 23C) and through which the oil component is discharged. Thus, the blow-by gas led into the housing 22 from the lead-in port 28 is separated by the gas-liquid separation unit 23A (23B, 23C) into the gas component and the oil component, which gas component is led out of the housing 22 through the lead-out port 29 and which oil component is discharged out of the housing 22 through the drain port 30.

Further, in the present embodiment, the housing 22 has the attachment portion 33 inside, to which a plurality of types of the gas-liquid separation units 23A to 23C can be attached. To the attachment portion 33, one gas-liquid separation unit 23A (23B, 23C) selected from among the plurality of types of gas-liquid separation units 23A to 23C is attached. Therefore, the appropriate gas-liquid separation unit 23A (23B, 23C) can be selected in accordance with an engine type and performance requirements and attached to the attachment portion 33. Consequently, the present embodiment can be applied to various types of engines. Further, by using the same housing 22 and a common forming die for a plurality of types of gas-liquid separation units, it is possible to reduce cost and simplify processes, thereby providing a simple low-cost structure.

Further, in the present embodiment, the housing 22 includes the first case 25 and the second case 26 whose connecting circumferential surfaces 25a and 26a are connected with each other, and the attachment portion 33 is provided on the second case 26 of two cases 25 and 26. Thus, it is possible to attach the gas-liquid separation unit 23A (23B, 23C) to the attachment portion 33 on this case 26 and then connect the first case 25 and the second case 26 to face each other. Consequently, ease of assembly for the oil separator 21 is further improved.

Further, in the present embodiment, the attachment portion 33 and the first case 25 are connected integrally at the welded portion 27b using vibration welding, so that the gas-liquid separation unit 23A (23B, 23C) can be attached securely.

Moreover, in the present embodiment, the plurality of types of gas-liquid separation units includes the filter type gas-liquid separation unit 23A, the impact type gas-liquid separation unit 23B, and the impact filter type gas-liquid separation unit 23C. Thus, it is possible, for example, to select the filter type gas-liquid separation unit 23A for high oil capture efficiency, the impact type gas-liquid separation unit 23B for low pressure loss, or the impact filter type gas-liquid separation unit 23C for an approximately medium oil capture efficiency and pressure loss.

Third Embodiment (1) Configuration of Oil Separator

Figure 16:
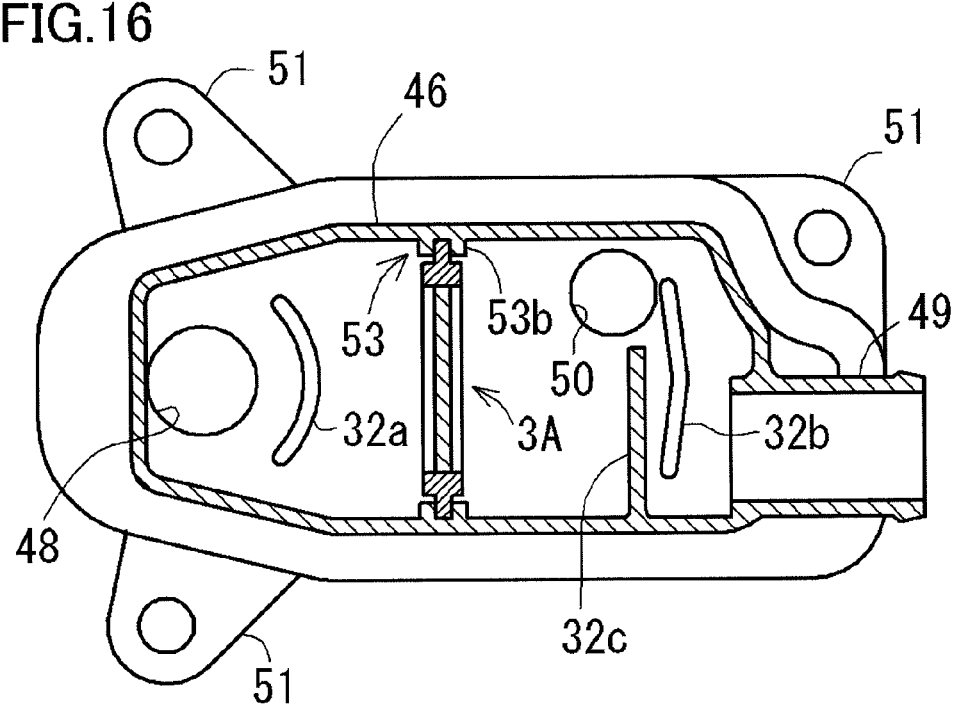
FIG. 16 is a cross-sectional view taken along line XVI-XVI of FIG. 15.

An oil separator 41 according to the present embodiment is an oil mist separator for capturing oil mist contained in blow-by gas generated in an engine (not shown), as shown in FIGS. 15 and 16. The oil separator 41 includes a housing 42 provided independently of a body of the engine and a gas-liquid separation unit 3A (3B, 3C) which is provided in the housing 42 and separates the blow-by gas into a gas component and an oil component.

The housing 42 includes first and second cases 45 and 46 made of resin, whose connecting circumferential surfaces 45a and 46a (see FIG. 17) are connected with each other at a welded portion 47a using vibration welding. The first case 45 has a hole-shaped lead-in port 48 which is provided on the upstream side of the gas-liquid separation unit 3A (3B, 3C) and through which blow-by gas is led in and a tube-shaped drain port 50 which is provided on the downstream side of the gas-liquid separation unit 3A (3B, 3C) and through which the oil component is discharged. Further, the second case 46 has a tube-shaped lead-out port 49 which is provided on the downstream side of the gas-liquid separation unit 3A (3B, 3C) and through which the gas component is led out. Moreover, on the bottom surface of the first case 45, a fixation portion 51 (see FIG. 16) is provided, which is fixed to the outer surface of a cylinder head cover (not shown) with a screw etc.

The first case 45 is provided with a baffle plate 32a which blocks the blow-by gas led in through the lead-in port 48 flowing directly toward the gas-liquid separation unit 3A (3B, 3C) and a guide plate 32b which guides the separated oil component to the drain port 50. Further, the second case 46 is provided with a baffle plate 32c which blocks the separated gas component flowing directly to the lead-out port 49.

In the housing 42, an attachment portion 53 is provided to which the gas-liquid separation unit 3A (3B, 3C) is attached. The attachment portion 53 includes a first attachment portion 53a which has a concave-shaped vertical section and is provided on the upper surface of the first case 45 and a second attachment portion 53b which has a concave-shaped vertical section and is provided along the inner circumferential surface of the second case 46 (see FIG. 17). Into the first attachment portion 53a, the outer circumferential-side lower end of the gas-liquid separation unit 3A (3B, 3C) is inserted, while to the second attachment portion 53b, the outer circumferential-side upper end and the two side ends of the gas-liquid separation unit 3A (3B, 3C) are fitted.

As the gas-liquid separation unit according to the third embodiment, the three types of gas-liquid separation units 3A to 3C described in the first embodiment are prepared. To the attachment portion 53, any one of the gas-liquid separation units 3A to 3C can be attached, and one gas-liquid separation unit 3A selected from among the plurality of types gas-liquid separation units 3A to 3C is attached to the attachment portion 53.

(2) Method for Assembling Oil Separator

Figure 17:
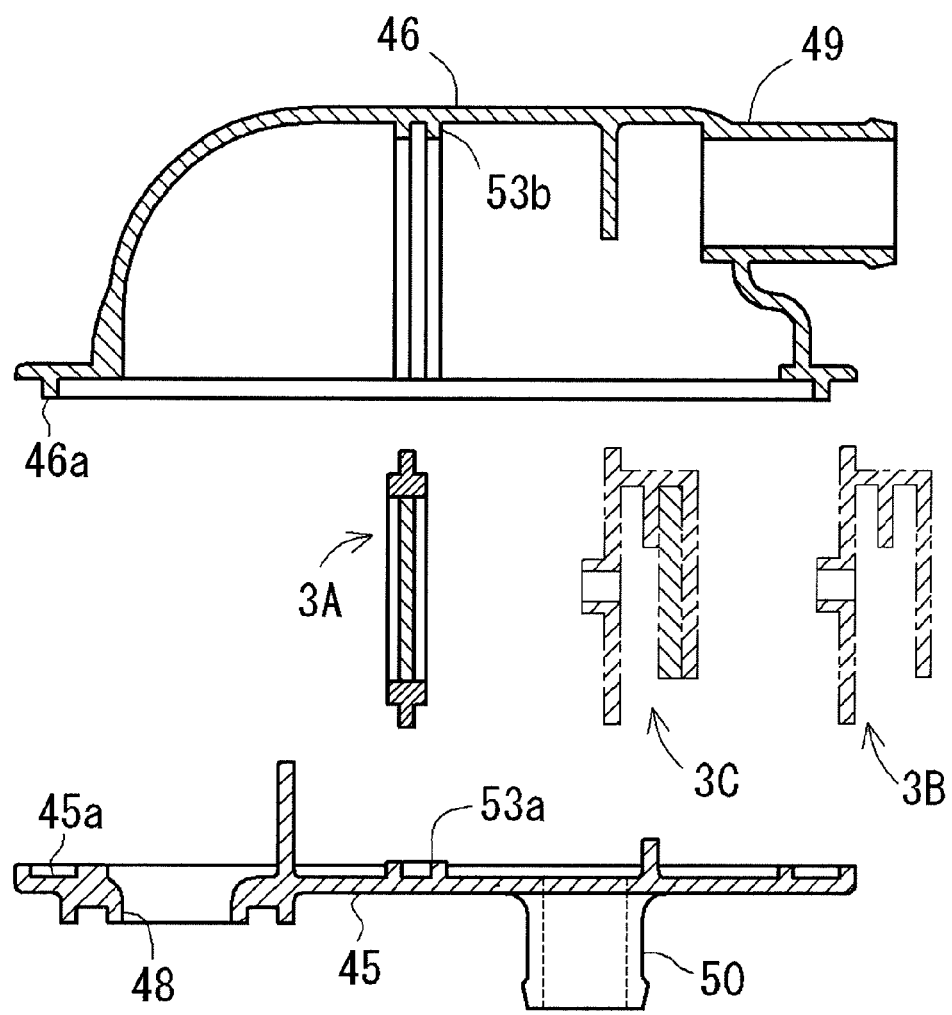
FIG. 17 is an explanatory view of a method for assembling the oil mist separator.
Figure 18:
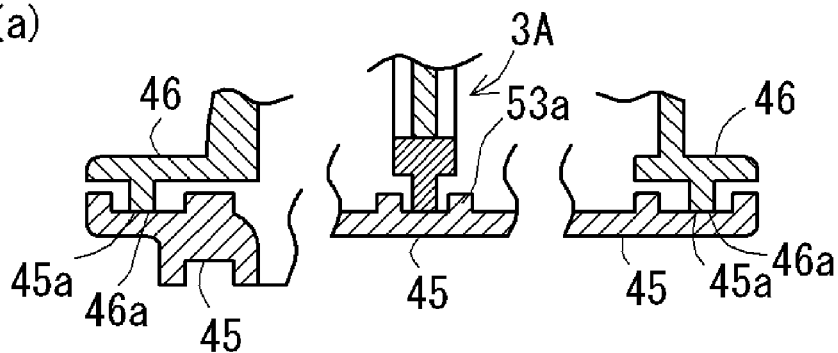
FIGS. 18(a) and (b) are explanatory views of the method for assembling the oil mist separator, FIG. 18(a) showing a state where connecting circumferential surfaces of the respective first and second cases are in contact with each other, and FIG. 18(b) showing a state where the connecting circumferential surfaces of the first and second cases are connected.
Figure 18:
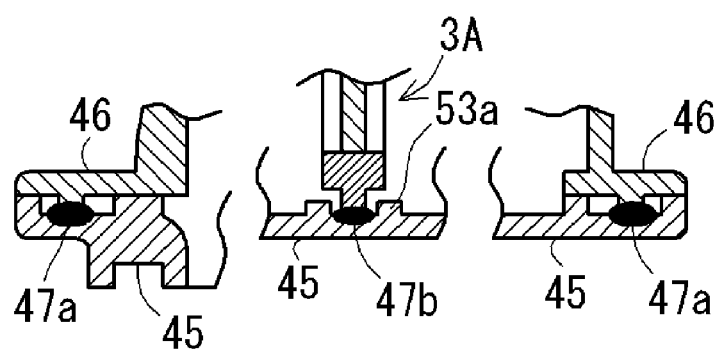

Next, a description will be given of a method for assembling the oil separator 41 having the configuration described above. As shown in FIG. 17, from among the plurality of types of gas-liquid separation units 3A to 3C, the appropriate gas-liquid separation unit 3A is selected in accordance with an engine type and performance requirements. Next, the gas-liquid separation unit 3A is temporarily fixed by fitting its outer circumferential side into the second attachment portion 53b, where by making the connecting circumferential surfaces 45a and 46a of the first case 45 and the second case 46 face each other, the gas-liquid separation unit 3A is sandwiched by the first attachment portion 53a and the second attachment portion 53b (see FIG. 18(a)). Subsequently, by vibration welding, the connecting circumferential surfaces 45a and 46a of the first and second cases 45 and 46 are connected with each other at a welded portion 47a, while the first attachment portion 53a and the gas-liquid separation unit 3A are connected with each other at a welded portion 47b (see FIG. 18(b)).

(3) Effects of the Embodiment

As described above, the oil separator 41 of the present embodiment includes the housing 42 provided independently of the body of the engine; and the gas-liquid separation unit 3A (3B, 3C) which is provided in the housing 42 and separates blow-by gas into a gas component and an oil component. The housing 42 includes: the lead-in port 48 which is provided on the upstream side of the gas-liquid separation unit 3A (3B, 3C) and through which the blow-by gas is led in; the lead-out port 49 which is provided on the downstream side of the gas-liquid separation unit 3A (3B, 3C) and through which the gas component is led out; and the drain port 50 which is provided on the downstream side of the gas-liquid separation unit 3A (3B, 3C) and though which the oil component is discharged. Thus, the blow-by gas led into the housing 42 from the lead-in port 48 is separated by the gas-liquid separation unit 3A (3B, 3C) into the gas component and the oil component, which gas component is led out of the housing 42 through the lead-out port 49 and which oil component is discharged out of the housing 42 through the drain port 50.

Further, in the present embodiment, the housing 42 has the attachment portion 53 inside, to which a plurality of types of the gas-liquid separation units 3A to 3C can be attached. To the attachment portion 53, one gas-liquid separation unit 3A (3B, 3C) selected from among the plurality of types of gas-liquid separation units 3A to 3C is attached, so that the appropriate gas-liquid separation unit 3A (3B, 3C) can be selected in accordance with an engine type and performance requirements and attached to the attachment portion 53. Consequently, the present embodiment can be applied to various types of engines. Further, by using the same housing 42 and a common forming die for a plurality of types of gas-liquid separation units, it is possible to reduce cost and simplify processes, thereby providing a simple low-cost structure.

Further, in the present embodiment, the housing 42 includes the first case 45 and the second case 46 whose connecting circumferential surfaces 45a and 46a are connected with each other, the attachment portion 53 includes the first attachment portion 53a which has a concave-shaped vertical section and is provided on the first case 45 and the second attachment portion 53b which has a concave-shaped vertical section and is provided on the second case 46, and the gas-liquid separation unit 3A (3B, 3C) is sandwiched by the first attachment portion 53a and the second attachment portion 53b. Thus, it is possible to attach the gas-liquid separation unit 3A (3B, 3C) to one of the attachment portion 53b of two attachment portions 53a and 53b and then connect the first case 45 and the second case 46 to face each other. Consequently, ease of assembly for the oil separator 41 is improved. In the present embodiment, the gas-liquid separation unit 3A (3B, 3C) and the attachment portion 53a are welded by vibration, so that a gap for vibration is kept between the two.

Further, in the present embodiment, the attachment portion 53 is formed as a closed ring, so that the entire outer circumference of the gas-liquid separation unit 3A (3B, 3C) is attached to the inner circumferential surface of the housing 42 with no gap in between, thereby improving gas-liquid separation efficiency for the blow-by gas.

Further, in the present embodiment, the gas-liquid separation unit 3A (3B, 3C) and the attachment portion 53a of the two attachment portions 53a and 53b are connected integrally at the welded portion 47b using vibration welding, so that the gas-liquid separation unit 3A (3B, 3C) can be attached securely.

Moreover, in the present embodiment, the plurality of types of gas-liquid separation units includes the filter type gas-liquid separation unit 3A, the impact type gas-liquid separation unit 3B, and the impact filter type gas-liquid separation unit 3C. Thus, it is possible, for example, to select the filter type gas-liquid separation unit 3A for high oil capture efficiency, the impact type gas-liquid separation unit 3B for low pressure loss, or the impact filter type gas-liquid separation unit 3C for an approximately medium oil capture efficiency and pressure loss.

In the invention, the embodiments described above can be variously modified within the scope of the invention in accordance with purposes and uses. That is, although in the first through third embodiments the oil separators 1, 21, and 41 provided on the outer surface of the cylinder head cover have been illustrated, the invention is not limited to it; for example, the oil separator may be provided on the outer surface of a cylinder block or disposed via a pipe on a body of an engine with a space in between.

Although in the first through third embodiments, the first cases 5, 25, and 45 and the second cases 6, 26, and 46 connected by vibration welding have been illustrated, the invention is not limited to it; for example, the first cases and the second cases may be connected by using laser welding, an adhesive agent, a screw, etc.

Figure 19:
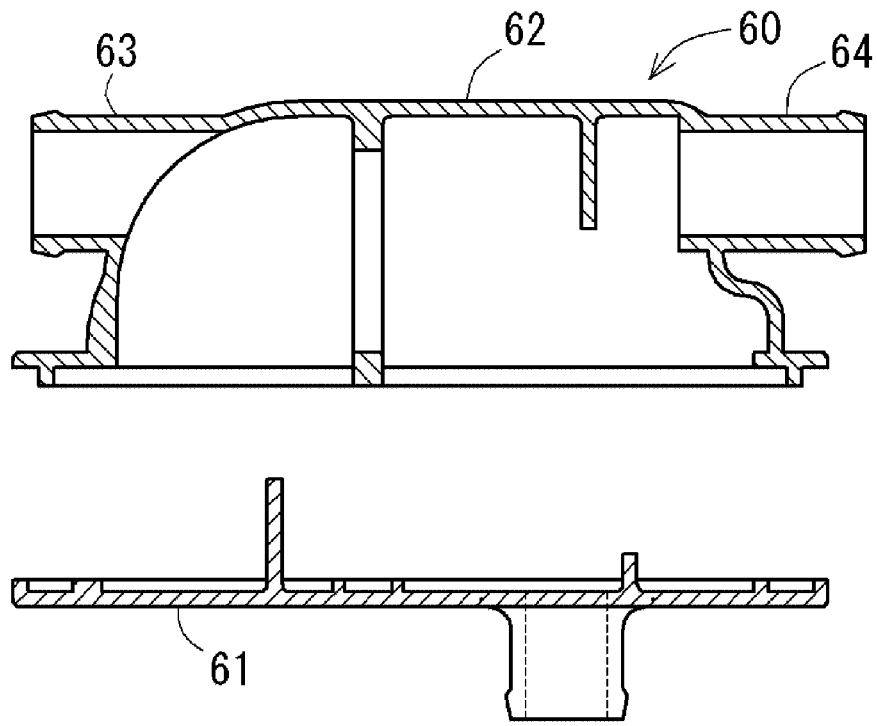
FIG. 19 is an explanatory view of a housing according to another embodiment.

Although in the second and third embodiments, the housing 22 and 42 have been illustrated as including the first cases 25 and 45 having the lead-in ports 28 and 48 and the second cases 26 and 46 having the lead-out ports 29 and 49 respectively, the invention is not limited to it; for example, a housing 60 may have a lead-in port 63 and a lead-out port 64 on a second case 62 of a first case 61 and the second case 62, as shown in FIG. 19. In the second and third embodiments, if the two types of housings 22 (42) and 60 are prepared so that any one of them can be selected, the invention can be applied further various types of engines.

Although in the first through third embodiments, the filter type, impact type, and impact filter type gas-liquid separation units have been illustrated, the invention is not limited to it; for example, a cyclone type one for centrifugally separating blow-by gas or a labyrinth type one for guiding it through a guide path may be employed.

Both of the labyrinth type gas-liquid separation unit and any other gas-liquid separation unit may be provided to separate comparatively large oil contained in blow-by gas with the labyrinth type gas-liquid separation unit and comparatively small oil mist with the other gas-liquid separation unit.

Although in the second embodiment the gas-liquid separation unit 23A (23B, 23C) has been attached by inserting and locking its hook portion 34a (36a) to the attachment portion 33, the invention is not limited to it; for example, the gas-liquid separation unit 23A (23B, 23C) may be attached to the attachment portion 33 by using welding, an adhesive agent, a screw, etc.

The invention may be widely utilized as a technology for capturing oil contained in blow-by gas generated in an engine.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above-described embodiments, and various variations and modifications may be possible without departing from the scope of the present invention.

What is claimed is:

1. An oil separator for capturing oil contained in blow-by gas generated in an engine, comprising:
    a housing provided independently of a body of the engine; and
    a gas-liquid separation unit which is provided in the housing and separates blow-by gas into a gas component and an oil component, wherein
    the housing includes a lead-in port which is provided on an upstream side of the gas-liquid separation unit and through which the blow-by gas is led in, a lead-out port which is provided on a downstream side of the gas-liquid separation unit and through which the gas component is led out, and a drain port which is provided on the downstream side of the gas-liquid separation unit and through which the oil component is discharged,
    the housing has an attachment portion inside to which the gas-liquid separation unit is attached,
    the housing includes a first case and a second case each having connecting circumferential surfaces that are connected with each other,
    the attachment portion includes a first attachment portion provided along the connecting circumferential surface of the first case and a second attachment portion provided along the connecting circumferential surface of the second case, and
    the gas-liquid separation unit is provided between the first attachment portion and the second attachment portion.

2. The oil separator according to claim 1, wherein the gas-liquid separation unit is one of a filter type gas-liquid separation unit having a filter through which all of blow-by gas passes, an impact type gas-liquid separation unit having a collision wall with which blow-by gas collides, or an impact filter type gas-liquid separation unit having a collision wall with which blow-by gas collides and a filter through which some of the blow-by gas passes.

3. The oil separator according to claim 1, wherein the connecting circumferential surface of the first case, the connecting circumferential surface of the second case and an outer circumferential surface of the gas-liquid separation unit are integrally connected at one of a vibration weld portion or a laser weld portion.

4. The oil separator according to claim 1, wherein the first case includes the lead-in port, and the second case includes the lead-out port and the drain port.

* * * * *